Patented Nov. 8, 1938

2,135,965

UNITED STATES PATENT OFFICE 2,135,965

MONOAZO COMPOUNDS

Miles A. Dahlen, Wilmington, and Frithjof Zwilgmeyer, Arden, Del., assignors to E. I. du Pont de Nemours & Company, Wilmington, Del., a corporation of Delaware No Drawing. Application July 22, 1936,
Serial No. 91,907

4 Claims. (Cl. 260—197)

This invention relates to azo dyes, especially to new coupling components or intermediates which may be used in the preparation of colors, particularly the so-called Diagens.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized in a manner which will be understood by persons skilled in the art, and is reacted with the second component, often in solution. Generally speaking, the aryl nuclei of the azo dyes may contain certain substituents which change, but do not originate, the color of the dyestuffs and are called "auxochromes." The auxochromes form a recognized class, divided into two groups, of which the one tends to make the dyestuff water-soluble, and the other does not. In this invention those auxochrome groups which tend to make the dyestuff water-soluble are called s-auxochromes and those which do not are called n-auxochromes.

The prior art azo dyes are applied to fabrics, or to other materials to be dyed, in three general ways: (a) The dyestuff is dissolved or dispersed in a suitable bath and the material is dipped in the bath. To be used in this manner the completed dyestuff must be substantive to the material which is to be dyed. (b) A substantive coupling component is directly affixed to the fabric, which is then treated with the diazotized component, completing the dye on the material. (c) A substantive azo component is directly affixed to the fabric which, treated with the coupling component, completes the dye on the material.

The term substantive means that the dye or the particular component has substantial affinity for the material from aqueous solution or suspension. In the preparation of azo dyes various so called coupling components have been combined with diazo arylamines to form the dye, but, as far as we are aware no coupling components or intermediates of the kind herein disclosed have been known.

It is an object of the invention to provide new compounds which may be useful as coupling components for the preparation of azo dyes. Another object of the invention is to provide intermediates especially suitable in the preparation of Diagens. Another object is to provide methods of making the new coupling components. Other objects of the invention will be apparent from the following description in the explanation of which various examples are set forth as illustrations of the invention.

The new coupling components are azo compounds which are represented by the general formula

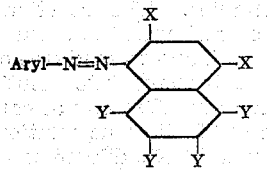

in which aryl represents the nucleus of a primary arylamine, one X represents an acyl amino group and the other X represents hydrogen; one Y represents —OH and the other Y's represent hydrogen. In this intermediate the amino acyl group may be attached in the positions indicated in one benzene ring of the naphthol nucleus and the hydroxyl may be attached in any position in the other benzene ring of the naphthol. Aryl may be without substituents, or it may carry any auxochrome substituent in any or all of the possible positions.

In forming the coupling component the aryl-azo-amino-naphthol is formed first and then the amino group of the naphthol is acylated. Thus, an arylamine of the general formula aryl—NH₂ with or without auxochrome substituents is diazotized. This may be coupled under acid conditions to an amino naphthol compound in which the —NH₂ is substituted on one of the benzene rings of the naphthalene nucleus and the —OH is substituted on the other. The aryl-azo-amino-naphthol is finally acylated to produce the aryl-azo-acylamino-naphthol which is the coupling component having generally the structure of the amine compound heretofore described, the difference being that the coupling component has the —NH acyl group instead of the —NH₂ group in the naphthol nucleus. Thus, this coupling component is represented by the general formula

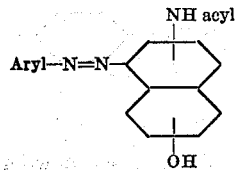

in which the —NH acyl is a substituent in one of the benzene rings of the naphthol nucleus and the hydroxyl is a substituent of the other benzene ring of the nucleus.

These compounds may advantageously include auxochromes as substituents in the aryl nuclei. The n-auxochromes are, specifically, the groups alkyl, alkoxy, halogen, aryloxy, aralkyl, aralkoxy, aryl, hydroaryloxy, and trifluoro-alkyl. Generally speaking, entirely satisfactory results can be obtained by the substitution in the aryl nuclei from one to three of these substituents but more can be used.

The following examples are set forth as illustrative but not as limitative of the invention.

Example I 13.8 parts of meta-nitraniline were diazotized in the usual manner and the diazo-salt coupled under acid conditions with 17.5 parts of 1-amino-7-naphthol. The precipitated product was neutralized with caustic soda, filtered, washed and dried.

30 parts of the aryl azo naphthol amine having the aryl group of meta nitraniline and the naphthol group of 1-amino-7-naphthol corresponding to the above described type aryl azo amine were produced.

About 30 parts of the amine were acylated by heating with 40 parts of acetic anhydride at 120° C. for 10 minutes. The reaction mass was drowned in ice and water and the precipitated product filtered off and washed free of acid. The precipitate was brought into solution with 60 parts of alcohol and 120 parts of caustic soda of 30% strength at 70° C. The solution was cooled with ice to about 20° C., diluted with cold water to about 600 parts total volume, and filtered to remove insoluble matter. The filtrate was acidified with hydrochloric acid, and the reprecipitated material filtered, washed free of acid and dried. 30 parts of the new coupling component of the following structure were obtained:

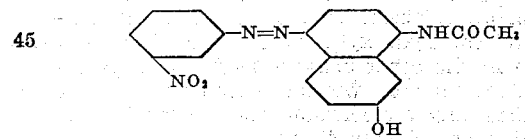

The product is a yellowish-brown powder.

Example II 16.8 parts of 5-nitro-2-aminoanisole were diazotized in the usual manner and the diazo-salt coupled under acid conditions to 17.5 parts of 1-amino-7-naphthol. The product was isolated as in Example I. 32 parts of the aryl azo naphthol amine of the type hereinbefore indicated having the aryl group of 5-nitro-2-aminoanisole and the naphthol group of 1-amino-7-naphthol were produced.

Abouts 20 parts of this amine were acylated with 40 parts of acetic anhydride by the procedure described in Example I, the product being purified as described in that example. 20.2 parts of the coupling component of the following formula were obtained:

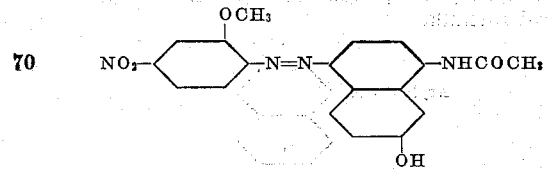

The product is a dark brown powder.

Example III 16.1 parts of 2:5-dichloro-aniline were diazotized in the usual manner and coupled to 17.5 parts of 1-amino-7-naphthol by a procedure similar to that described in Example I. 31 parts of the aryl azo naphthol amine having the aryl group of 2:5-dichloro-aniline and the naphthol group of 1-amino-7-naphthol corresponding to the above described type amine were produced.

About 30 parts of this amine were acylated with 30 parts of acetic anhydride by a process similar to that described in Example I. 31.5 parts of a brown coupling component of the following formula were obtained:

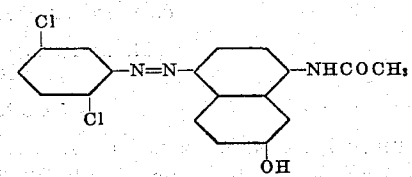

The product is a yellowish-brown powder.

Example IV 13.8 parts of meta-nitraniline were diazotized in the usual manner and coupled under acid conditions to 17.5 parts of 1-amino-6-naphthol, by the procedure described in Example I. 30 parts of the aryl azo naphthol amine of the type hereinbefore indicated, having the aryl group of meta-nitraniline and the naphthol group of 1-amino-6-naphthol were produced.

About 30 parts of this amine were acylated with 30 parts of acetic anhydride by the procedure described in Example I. 29.4 parts of the dark brown amino-azo compound represented by the following formula were obtained:

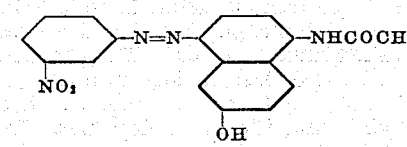

The product is a yellowish-brown powder.

Example V 13.8 parts of meta-nitraniline were diazotized and the diazo-salt coupled under acid conditions to 17.5 parts of 2-amino-6-naphthol, yielding 29 parts of the aryl azo naphthol amine produced by diazotizing meta-nitraniline and coupling the same to 2-amino-6-naphthol as described in Example III.

About 30 parts of this amine were acylated with acetic anhydride, yielding 27 parts of a brown coupling component of the following formula:

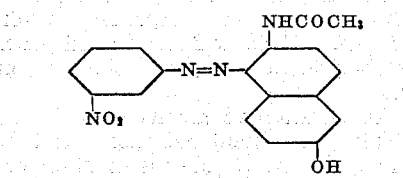

The product is a yellowish-brown powder.

Example VI 10 parts of the amino azo compound produced in accordance with Example III were benzoylated by treatment with an excess of benzoyl chloride in aqueous-alkaline suspension. The excess benzoyl chloride was hydrolyzed, and the insoluble product removed by filtration. It was purified by the procedure described in Example I. 11.0 parts of a brown coupling component of the following formula were obtained:

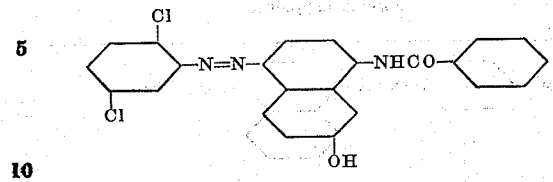

The product is a yellowish-brown powder.

Example VII

The acylated product produced in accordance with Example I was reduced with sodium sulfhydrate to reduce the NO₂ substituent of the aniline group producing the new coupling component of the following formula:

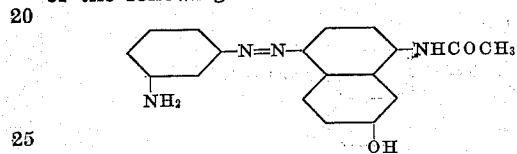

The product is a yellowish-brown powder.

Example VIII

Coupling component described in Example VII, was acylated in the usual manner, yielding a new coupling component of the following structure:

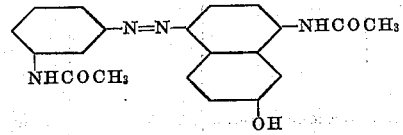

The product is a dark brown powder.

The following Table I lists additional coupling components prepared by processes similar to the foregoing examples.

The column entitled "Arylamine diazotized" shows the amines which are diazotized and coupled with the compounds shown in the second column entitled "Coupled to." The third column entitled "Acylated with" shows the acid with which the aryl azo amine is acylated to form the coupling compound shown in the last column which is entitled "Formula of product."

Table I

| Example | Arylamine diazotized | Coupled to— | Acylated with— | Formula of product |
|---|---|---|---|---|
| IX | Aniline | 1:7-amino-naphthol | Acetic-anhydride | (phenyl)-N=N-(naphthyl with NHCOCH₃ and OH) |
| X | 3-nitro-4-amino-toluene | 2:6-amino-naphthol | do | (CH₃, NO₂ phenyl)-N=N-(naphthyl with NHCOCH₃ and OH) |
| XI | Aniline | 1:7-amino-naphthol | do | (phenyl)-N=N-(naphthyl with NHCOCH₃ and OH) |
| XII | 4-chloro-2-amino-toluene | do | do | (CH₃, Cl phenyl)-N=N-(naphthyl with NHCOCH₃ and OH) |
| XIII | 4-nitro-2-amino-anisole | do | do | (OCH₃, NO₂ phenyl)-N=N-(naphthyl with NHCOCH₃ and OH) |
| XIV | 4-chloro-2-amino-anisole | do | do | (OCH₃, Cl phenyl)-N=N-(naphthyl with NHCOCH₃ and OH) |

Table I—Continued

| Example | Arylamine diazotized | Coupled to— | Acylated with— | Formula of product |
|---|---|---|---|---|
| XV | Para-phenetidine | 1:7-amino-naphthol | Acetic-anhydride | 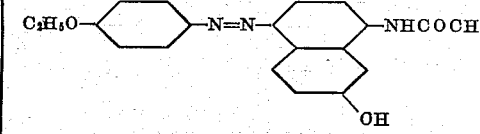 |
| XVI | Ortho-phenetidine | do | do | 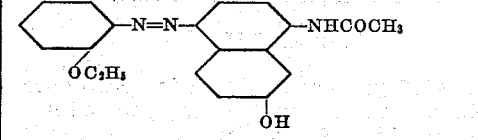 |
| XVII | Alpha-amino-anthraquinone | do | do | 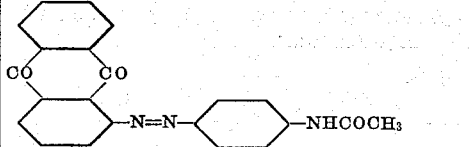 |
| XVIII | Meta-nitraniline | do | Benzoyl chloride | 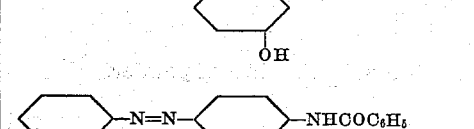 |
| XIX | 3-nitro-4-amino-toluene | do | do | 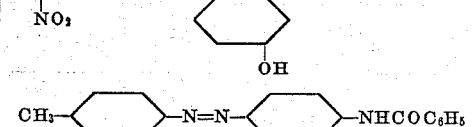 |
| XX | 4-chloro-2-amino-toluene | do | do |  |
| XXI | 4-nitro-2-amino-anisole | do | do | 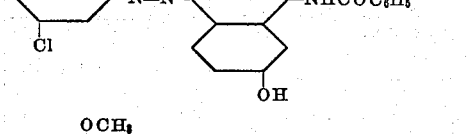 |
| XXII | 5-nitro-2-amino-anisole | do | do | 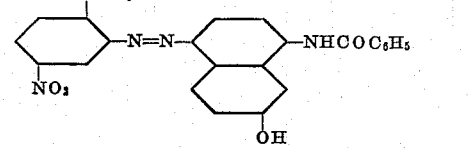 |
| XXIII | 4-chloro-2-amino-anisole | do | do | 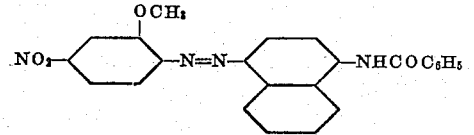 |
| XXIV | do | do | Furoyl-chloride | 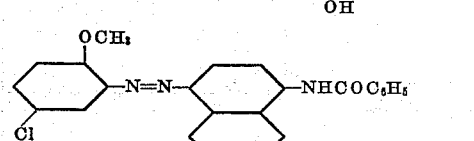 |

Table I—Continued

| Example | Arylamine diazotized | Coupled to— | Acylated with— | Formula of product |
|---|---|---|---|---|
| XXV | 4-chloro-2-amino-anisole. | 1:7-amino-naphthol. | Hexahydro-benzoyl-chloride. | (structure: Cl, OCH₃-phenyl–N=N–naphthol(OH)–NHCO-CH(CH₂-CH₂)(CH₂-CH₂)) |
| XXVI | ...do... | ...do... | Methyl-chloro-carbonate. | (structure: Cl, OCH₃-phenyl–N=N–naphthol(OH)–NH–COOCH₃) |
| XXVII | 3-nitro-4-amino-toluene. | ...do... | Acetic anhydride. | (structure: CH₃-phenyl(NO₂)–N=N–naphthol(OH)–NHCOCH₃) |
| XXVIII | Meta-nitraniline | 1:5-amino-naphthol. | ...do... | (structure: NO₂-phenyl–N=N–naphthol(HO)–NHCOCH₃) |

The above examples point out only a few members of a large series of new monoazo compounds suitable for use as coupling components in Diagens and Ice Colors which may be made in accordance with the invention. Generally speaking, all the arylamines commonly used in the Ice Color and Diagen art may be diazotized and coupled under acid conditions with the aminonaphthols to form the coupling components of this invention, provided that the amino group is substituted on one benzene ring of the naphthalene nucleus and the hydroxyl group is substituted on the other. The amino-aryl-azo compounds obtained by this coupling may be acylated with any of the usual acylating agents. In addition to acetylation, benzoylation, furoylation, hexa-hydro-benzoylation and carbo-methoxylation, mentioned in the examples, other illustrations of acylations are mentioned which may be effected by the use of agents such as:

Propionyl-chloride
Iso-valeryl-chloride
Para-nitro-benzoyl-chloride
Ortho-chloro-benzoyl-chloride
Alpha-naphthoyl-chloride
Anthraquinone beta-carbonyl-chloride
Benzoic-anhydride
Butyl-chloro-carbonate
Phosgene
Para-nitro-phenyl-carbamyl-chloride It will be understood that the conditions for diazotizing the arylamines will be varied in accordance with the nature of the arylamines, in the manner well known in the art of azo color preparation. Likewise, the conditions of acidity, temperature, etc., for the coupling of these diazo-salts with the amino-naphthols may be varied in accordance with the compounds used. The conditions selected in each instance are desirably those which yield a maximum of coupling in the ring containing the amino group, and a minimum of coupling in the ring containing the hydroxyl group.

It will be evident to those skilled in the art that the present invention can be utilized in various ways, for example, to make compositions for dyeing, such as non-acid pastes, powders and liquids containing an azo component stabilized against reaction with the coupling component. In the operation of dyeing, these compositions may be applied to the material to be dyed in any suitable manner, and then acidified, whereupon the dye is formed and affixed to the material. By acidifying such compositions, insoluble pigments may also be prepared apart from the material to be dyed, and the pigments may be used in various forms and with many different materials. In the preparation of pastes and other compositions a variety of stabilizing agents known to the art can be used, such as those commonly used in the preparation of developed azo dyes.

As many different embodiments of the invention will be apparent to those skilled in the art without departure from the spirit and scope of the described invention, it is to be understood that no limitations are intended in the annexed claims except such as are imposed by the prior art or are specifically recited.

We claim:

1. The azo compound represented by the formula

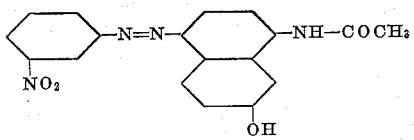

2. The azo compound represented by the formula

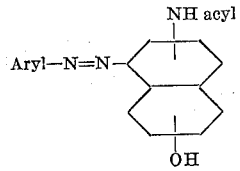

in which there is at least one substituent in aryl selected from the group consisting of hydrogen, amino, nitro and the n-auxochromes.

3. The azo compound represented by the formula

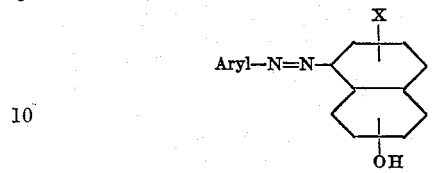

in which X represents an amino acyl substituent.

4. An azo compound represented by the formula

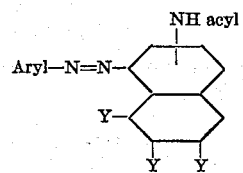

in which one Y is hydroxyl and the other two Y's are hydrogen.

MILES A. DAHLEN.
FRITHJOF ZWILGMEYER.